Nov. 19, 1929.  A. C. VOBACH  1,736,234
ART OF REFINING HYDROCARBONS
Filed Feb. 29, 1928
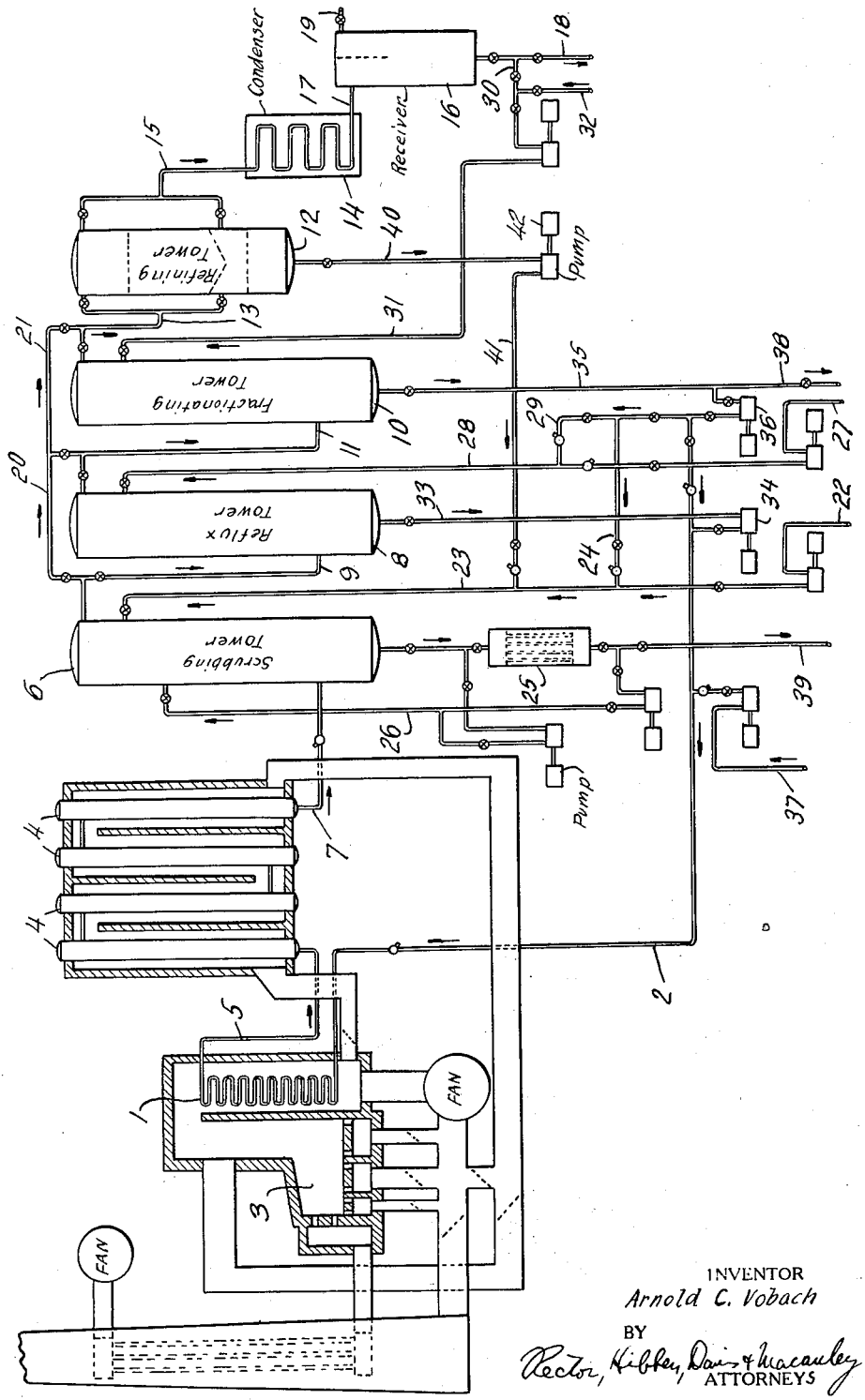
INVENTOR
Arnold C. Vobach
BY
ATTORNEYS Patented Nov. 19, 1929

1,736,234

UNITED STATES PATENT OFFICE

ARNOLD C. VOBACH, OF WHITING, INDIANA, ASSIGNOR TO SINCLAIR REFINING COMPANY, OF NEW YORK, N. Y., A CORPORATION OF MAINE

ART OF REFINING HYDROCARBONS

Application filed February 29, 1928. Serial No. 257,945.

This invention relates to improvements in the manufacture of gasoline; more particularly the invention relates to improvements in the combined cracking of oil to produce gasoline and refining of the cracked gasoline by passage through an adsorptive catalyst in vapor phase.

When gasoline or a gasoline-containing fraction is passed in vapor phase through an adsorptive catalyst such as fuller's earth, certain unsaturated constituents such as diolefines, to the extent that they are present, are polymerized to form higher boiling polymers. This reaction affords a means of separating such constituents without involving loss of other unsaturated constituents. This general refining method is applied particularly to gasoline intended for use as motor fuel because it makes possible the removal of objectionable unsaturated constituents without removal of unsaturated constituents of special value as components of motor fuel gasoline. The separation of the polymers produced by the vapor-catalyst contact is usually accomplished by fractional condensation, liquefaction, either in the refining operation proper or in some subsequent fractionating operation. The separated liquefied polymers usually include light and intermediate oil constituents as well as heavy constituents, tars and the like.

As applied to gasoline-containing vapors from cracking operations, this general refining method is particularly useful because the cracking reaction, particularly when the oil is subjected to severe cracking conditions, usually involves the production of both objectionable and valuable unsaturated constituents. The cracking operation is frequently carried out under severe cracking conditions to increase the concentration of valuable unsaturated constituents in the cracked gasoline product but this same increase in severity of the cracking conditions also tends to increase the concentration of objectionable unsaturated constituents in the product. As the amount of objectionable unsaturated constituents increases, the amount of higher boiling polymers produced when this general refining method is applied increases.

The light oil constituents of liquefied polymers separated in carrying out this general refining method usually include some constituents suitable as components of the gasoline product. The intermediate oil constituents, and sometimes part of the light oil constituents, usually are suitable as components of stocks to be cracked. Some of the intermediate oil constituents, and sometimes some of the lighter oil constituents, are products of the polymerization reaction, but usually much of the intermediate constituents and most of the lighter constituents are included in the separated liquefied polymers because of entrainment. Such entrainment tends to increase as the amount of polymers produced increases. The heavy constituents of the separated liquefied polymers are objectionable as components of stock to be cracked.

This invention provides a particularly advantageous combined cracking and refining operation which includes the separation of heavy constituents from polymers produced in the refining operation, the recovery of constituents suitable as components of the product entrained in liquefied polymers separated in the operation, the return to the cracking operaton of all suitable constituents of separated liquefied polymers without return of objectionable heavy constituents tending to interfere with the cracking operation, the return to the cracking operation of all suitable constituents of separated liquefied polymers without return of constituents suitable as components of the product avoiding any tendency toward overcracking of this material, and the return to the cracking operation of all suitable constituents entrained in separated liquefied polymers. The invention is particularly useful when there is a large amount of separated liquefied polymers to be handled, when there is entrainment in separated liquefied polymers of constituents valuable either as components of the product or as stock to be cracked, and when the content of heavy constituents, tar and the like, in separated liquefied polymers is high.

According to the present invention, the gasoline-containing vapors from the cracking operation proper are subjected to a scrubbing treatment in which heavy constituents unsuitable either as components of the gasoline product or to be returned to the cracking operation are separated and discharged without being permitted to return to the cracking operation, after such separation and discharge of these heavy constituents the gasoline-containing vapors are passed through an adsorptive catalyst in vapor phase, the polymers produced by the vapor-catalyst contact are liquefied and separated from the resulting vapor mixture, either in the refining operation proper or in some subsequent fractionating operation, and the separated liquefied polymers are supplied to the scrubbing treatment where light and intermediate constituents are vaporized to escape with the gasoline-containing vapors escaping from the scrubbing treatment and heavy constituents, tar and the like, are separated and discharged with the first-mentioned heavy constituents without being permitted to return to the cracking operation. The scrubbing treatment operates to separate heavy constituents, tar and the like, produced in the cracking operation proper as well as those included in liquefied polymers supplied thereto and also operates to keep the escaping gasoline-containing vapors free from such constituents from any source. The vapor mixture escaping from the scrubbing treatment, before being passed through the adsorptive catalyst, is with advantage subjected to a refluxing operation in which those constituents heavier than suitable as components of the gasoline product yet suitable as components of the stock supplied to the cracking operation proper are condensed and from which the resulting oil mixture is supplied to the cracking operation. Raw stock to be supplied to the cracking operation may be supplied to this refluxing operation and supplied to the cracking operation proper with the condensate therefrom. The intermediate constituents of the liquefied polymers separated in the refining operation vaporized in the scrubbing treatment may be so condensed and returned to the cracking operation proper with the condensate from the refluxing operation. The vapor mixture escaping from the refining operation, either with or without further fractionation, is condensed to form a refined gasoline product.

The invention will be further described in connection with the accompanying drawings which illustrate, diagrammatically and conventionally, one form of apparatus adapted for carrying out the invention, but it will be understood that the invention can be carried out in other and different forms of apparatus.

The apparatus illustrated includes a vapor phase cracking apparatus described more in detail in an application of Harry L. Pelzer, filed June 13, 1927, Serial No. 198,621. This particular apparatus is shown for purposes of illustration because the invention is useful in connection with the operation of this apparatus and because the invention is particularly useful in connection with the operation of this or other vapor phase cracking apparatus because of the severe cracking conditions usually maintained in operation.

Referring to the drawings, raw oil or reflux condensate or a mixture of the two is supplied to the heating conduit 1 through connection 2, is heated and vaporized and the vapors superheated in the heating conduit, the vapors are passed through the digesting drums 4 through connection 5 and from the last digesting drum are discharged into the lower end of the scrubbing tower 6 through connection 7. For example, the temperature of the vapors passing from the heating conduit 1 to the digesting drums 4 may approximate 1000–1200° F., the temperature of the vapors passing from the digesting drums 4 to the scrubbing tower 6 may approximate 950–1100° F., and the oil may be supplied to the heating conduit 1 under pressure sufficient to force the oil and oil vapors through the apparatus, the pressure in the scrubbing tower 6 may appoximate 1–3 inches of mercury. Vapors escape from the upper end of the scrubbing tower 6 to the lower end of reflux tower 8 through connection 9, from the upper end of reflux tower 8 to the lower end of fractionating tower 10 through connection 11, from the upper end of fractionating tower 10 to the refining tower 12 through connection 13, either upwardly or downwardly through the refining tower 12, and from the refining tower 12 to the condenser 14 through connection 15. The condenser 15 discharges into receiver and separator 16 through connection 17. The condensed product is discharged from the receiver 16 through connection 18 and uncondensed vapors and gases through connection 19. Either or both the reflux tower 8 and the fractionating tower 10 may be bypassed by means of connections 20 and 21. The scrubbing treatment carried out in tower 6 may be effected or controlled by the introduction of raw oil, particularly stock containing heavy constituents not suitable to be supplied to the heating conduit, through connections 22 and 23, by the introduction of condensate from the fractionating tower 10 through connections 24 and 23, by the recirculation through the tower of the heavy separated material, either before or after cooling in cooler 25, through connection 26, or by any combination of these means. The refluxing operation carried out in tower 8 may be effected or controlled by the introduction of raw oil through connections 27 and 28 or by the introduction of condensate from the fractionating tower 10 through connections 29 and 28, or by the introduction of both. The fractionating operation carried out in tower 10 may be effected or controlled by the introduction of part of the condensed product through connections 30 and 31 or by the introduction of another refluxing medium such as another gasoline fraction through connections 32 and 31. Condensate and any admixed unvaporized raw oil from tower 8 may be supplied to the heating conduit 1 through connections 33 and 2 by means of hot oil pump 34. Condensate from tower 10 may be supplied to the heating conduit 1 through connections 35 and 2 by means of hot oil pump 36. Raw oil may also be supplied directly to the heating conduit 1 through connections 37 and 2. Condensate from tower 10 may be discharged through connection 38. The heavy material separated in the scrubbing tower 6 is discharged through connection 39. A charge of a suitable adsorptive catalyst, for example, fuller's earth of 40–60 or 60–80 mesh, is supported upon a foraminous partition in the refining tower 12. In accordance with the present invention, the polymers produced by the vapor-catalyst contact in the refining tower 12 and liquefied and separated therein are supplied through connections 40, 41 and 23 to the upper end of the scrubbing tower 6 and there are introduced into the vapors in the scrubbing tower, by means of pump 42.

In carrying out the invention in the apparatus illustrated, heavy constituents, tars and the like, unsuitable either as components of the gasoline product or to be returned to the heating conduit are separated in the scrubbing tower 6 and discharged through connection 39 without being permitted to return to the heating conduit, after escaping from the scrubbing tower 6 the gasoline-containing vapors pass through the adsorptive catalyst in the refining tower 12 (they may pass first through either or both the reflux tower 8 and the fractionating tower 10), the polymers produced by the vapor-catalysts contact are liquefied and separated from the resulting vapor mixture in the refining operation, the gasoline or gasoline-containing vapors escape to the condenser 14, the separated liquefied polymers are discharged through connection 40 and introduced into the upper end of the scrubbing tower 6, heavy constituents of the liquefield polymers so introduced into the scrubbing tower are discharged through connection 39 with the heavy material separated from the gasoline-containing vapors from the cracking operation without being permitted to return to the heating conduit, the rest of the liquefied polymers so introduced into the scrubbing tower are vaporized and the vapors so formed escape with the gasoline-containing vapors from the cracking operation. The vaporized constituents of the liquefied polymers supplied to the scrubbing treatment then are condensed in tower 8 and 10 with the corresponding fraction of the vapors from the cracking operation, intermediate constituents suitable as components of the stock supplied to the cracking operation are condensed in the reflux tower 8 and returned to the heating conduit with the condensate therefrom, other intermediate or light constituents may be condensed in the fractionating tower 10, and light constituents suitable as components of the gasoline product pass on with the gasoline-containing vapors to the condenser 14. When used, the fractionating tower 10 may be operated to condense all constituents heavier than suitable as components of the gasoline product desired so that the condensate discharged from receiver 16 is of the required end boiling point.

The heating furnace illustrated comprises a fire-box 3 in which fuel is burned, a heating flue in which the heating conduit I is arranged and a heating chamber in which the digesting drums 4 are arranged communicating with the fire-box, a fan for recirculating part of the escaping heating gases through the heating flue and the heating chamber and for discharging the rest through a stack, and a fan and heat exchanger arranged in the stack for supplying preheated air to the fire-box for combustion, with appropriate connections and dampers as shown.

I claim:

In the combined cracking of oil to produce gasoline and refining of the cracked gasoline by passage through an adsorptive catalyst in vapor phase, the improvement which comprises subjecting the gasoline-containing vapors from the cracking operation to a scrubbing treatment and therein separating heavy constituents unsuitable either as components of the gasoline product or to be returned to the cracking operation, discharging such separated heavy constituents without permitting them to return to the cracking operation, subjecting the gasoline-containing vapors escaping from the scrubbing treatment to a refluxing operation and therein condensing intermediate constituents heavier than suitable as components of the gasoline product, returning such condensed intermediate constituents to the cracking operation, passing gasoline-containing vapors escaping from the refluxing operation through the adsorptive catalyst in vapor phase, separating liquefied polymers produced by the vapor-catalyst contact from the resulting vapor mixture, supplying such separated liquefied polymers to the scrubbing treatment and therein vaporizing light and intermediate oil constituents thereof whereby such vaporized oil constituents escape with the gasoline-containing vapors from the scrubbing treatment, discharging the unvaporized heavier constituents of the liquefied polymers supplied to the scrubbing treatment with the first-mentioned heavy constituents separated in the scrubbing treatment without permitting them to return to the cracking operation, and condensing in the refluxing operation and returning to the cracking operation with the condensate therefrom intermediate oil constitutents of the liquefied polymers vaporized in the scrubbing treatment.

In testimony whereof I have subscribed my name.

ARNOLD C. VOBACH.